United States Patent Office 2,921,938
Patented Jan. 19, 1960

2,921,938
CERTAIN 8 - HYDROCARBON - 3 - PHENYLNORTROPINE LOWER-ALKANOATE ESTERS AND THEIR SYNTHESIS

William F. Wetterau, Albany, N.Y., assignor to Sterling Drug Inc., New York, N.Y., a corporation of Delaware No Drawing. Application April 30, 1958
Serial No. 731,854

16 Claims. (Cl. 260—292)

This invention relates to compositions of matter of the class of substituted 3-phenylnortropines and to processes for their preparation.

The invention here resides in the concept of a composition having a molecular structure in which the hydrogen atom of the 3-hydroxyl radical of an 8-hydrocarbyl-3-phenylnortropine is replaced by a lower-alkanoyl radical. The invention further resides in a process for physically embodying such concept.

The physical embodiments of my invention have analgesic activity, as determined by standard pharmacological evaluation procedures in rats.

Among the compounds of my invention are those which in free base form have the structural formula I

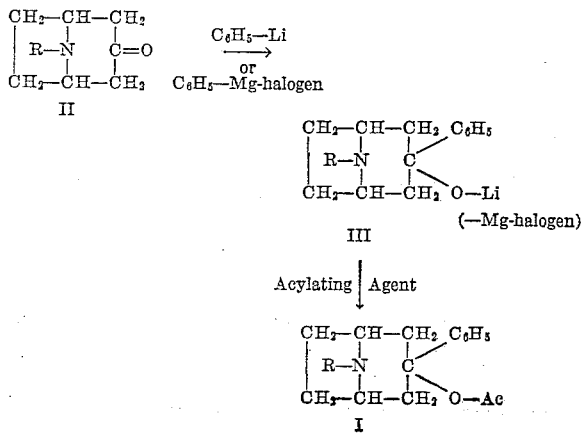

where R is a hydrocarbyl radical having from one to ten carbon atoms and Ac is a lower-alkanoyl radical.

The term "hydrocarbyl," as used herein, means hydrocarbon radicals having from one to ten carbon atoms inclusive and comprehends alkyl, alkenyl, phenylalkyl, phenylalkenyl, phenyl, alkylated-phenyl, cycloalkyl, cycloalkylalkyl, and the like, as illustrated by methyl, n-butyl, isobutyl, n-hexyl, n-octyl, n-decyl, 2-propenyl, benzyl, 2-phenylethyl, 3-phenylpropyl, 4-phenylbutyl, 3-phenyl-2-propenyl (i.e., cinnamyl), 4-methylphenyl, cyclopropyl, cyclohexyl, cyclopentylmethyl, cyclohexylethyl, and the like.

The term "lower-alkanoyl," as used herein, means alkanoyl radicals having preferably from two to four carbon atoms and is illustrated by ethanoyl (acetyl), n-propanoyl (propionyl), n-butanoyl, 2-methylpropanoyl, and the like.

My 8-hydrocarbyl-3-phenylnortropine lower-alkanoates in free base form are prepared by reacting an 8-(hydrocarbyl)-nortropinone with phenyllithium or phenylmagnesium halide and reacting the resulting 8-hydrocarbyl-3-phenylnortropine as its metal salt with a lower-alkanoylating agent. This method is illustrated structurally as follows:

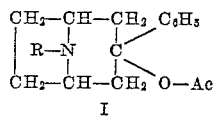

where R and Ac have the meanings given above. Reaction of the 8-(hydrocarbyl)-nortropinone (II) with phenyllithium or phenylmagnesium halide is carried out by heating the reactants in an inert medium, preferably a solvent mixture of ether and benzene. The resulting 8-hydrocarbyl-3-phenylnortropine as its lithium or magnesium halide salt (III) is reacted with a lower-alkanoylating agent, preferably by reacting with an alkanoic anhydride of the formula $Ac_2O$ in an inert solvent such as benzene or toluene and preferably maintaining the temperature between about 5–50° C. Alternatively, but less satisfactory, the acylation can be carried out by using an alkanoyl halide (Ac-halogen) in an inert basic solvent such as pyridine. Illustrative of this procedure is the reaction of 8-(3-phenylpropyl)-nortropinone with phenyllithium to yield the lithium salt of 8-(3-phenylpropyl)-3-phenylnortropine, which is then reacted with n-propanoic (or propionic) anhydride to produce 8-(3-phenylpropyl)-3-phenylnortropine n-propanoate (or propionate). Use of the corresponding intermediate 8-(3-phenyl-2-propenyl)nortropinone, tropinone (8-methylnortropinone) or 8-n-octyl-nortropinone results in the formation of 8-(3-phenyl-2-propenyl)-3-phenylnortropine n-propanoate, 3-phenyltropine (8-methyl-3-phenylnortropine) n-propanoate or 8-n-octyl-3-phenylnortropine n-propanoate, respectively.

The intermediate 8-(hydrocarbyl)-nortropinone where the hydrocarbyl radical is methyl is known; this compound is more commonly known as tropinone. The other intermediate 8-(hydrocarbyl)-nortropinones were prepared preferably by reacting succinic dialdehyde with the appropriate hydrocarbylamine R—$NH_2$, and a dialkyl ester of acetone-1,3-dicarboxylic acid to form 2,4-di-(carbomethoxy)-8-(hydrocarbyl)-nortropinone, and then heating the 2,4-di-(carbomethoxy) compound in an acidic medium to hydrolyze it to the 2,4-dicarboxy compound which in turn was decarboxylated to form the intermediate 8-(hydrocarbyl)-nortropinone.

My new 8-(hydrocarbyl)-3-phenylnortropine lower-alkanoates are useful in the free base form or in the form of acid-addition salts; and both forms are within the purview of the invention, and, in fact, are considered to be one and the same invention. The acid-addition salts are simply a more convenient form for use; and, in practice, the use of the salt form inherently amounts to use of the base form. As used in the appended claims, unless specifically designated otherwise, the term "8-hydrocarbyl-3-phenylnortropine lower-alkanoate" means both the free base form and the acid-addition salt form of the molecular structure recited. The acids which can be used to prepare acid-addition salts are preferably those which produce, when combined with the free base, pharmacologically acceptable salts, that is, salts whose anions are relatively innocuous to an animal organism in pharmacological doses of the salts, so that the beneficial physiological properties inherent in the free base are not vitiated by side effects ascribable to the anions; in other words, the latter do not substantially affect the pharmacological properties inherent in the cations. In practicing my invention, I found it convenient to employ the hydrochloride, ethanesulfonate or methanesulfonate salts. However, other appropriate pharmacologically aceptable acid-addition salts are those derived from mineral acids such as hydrobromic acid, hydriodic acid, nitric acid, phosphoric acid, sulfamic acid and sulfuric acid; and organic acids such as acetic acid, citric acid, tartaric acid, lactic aid, quinic acid, methanesulfonic acid, ethanesulfonic acid, and the like, giving the hydrobromide, hydriodide, nitrate, phosphate, sulfamate, sulfate, acetate, citric, tartrate, lactate, quinate, methanesulfonate and ethanesulfonate salts, respectively.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Although pharmacologically acceptable salts are preferred, all acid-addition salts are within the scope of my invention. All acid-addition salts are useful as sources of the free base form even if the particular salt per se is not desired as the final product, as for example when the salt is formed only for purposes of purification or identification, or when it is used as an intermediate in preparing a pharmacologically acceptable salt by ion exchange procedures.

The molecular structures of my compound are established by their mode of synthesis and corroborated by the correspondence of calculated and found values for the elementary analyses for representative examples.

The following examples will further illustrate the invention without, however, limiting it thereto.

EXAMPLE 1

A. *8-(hydrocarbyl)-nortropinones.*—The preparation of these compounds is illustrated by the following synthesis of 8-(3-phenylpropyl) nortropinone: 492 g. of 2,5-diethoxytetrahydrofuran was suspended in two liters of water and 2 cc. of concentrated hydrochloric acid was added. The mixture was stirred at room temperature for about seventy-five minutes, whereupon there resulted a clear solution containing succinic dialdehyde. To this solution was added at room temperature an aqueous solution containing 400 g. of 3-phenylpropylamine (dissolved in 500 cc. of water by the addition of 250 cc. of concentrated hydrochloric acid), followed by the immediate addition of 508 g. of dimethyl acetone-1,3-dicarboxylate. The resulting mixture was stirred at room temperature for seven hours and then allowed to stand overnight. Three liters of concentrated hydrochloric acid were added and the reaction mixture was warmed slowly to reflux for a six hour period after which time the evolution of carbon dioxide had practically ceased. The contents of the flask were cooled in an ice bath, decanted from a small amount of tar-like material, treated with decolorizing charcoal and filtered using a filter aid such as Filter-Cel. This acidic solution was then made alkaline with solid potassium hydroxide, maintaining the temperature below 30° C. The liberated 8-(3-phenylpropyl)-nortropinone was taken up in methylene chloride, washed three times with water, dried over anhydrous sodium sulfate and the solvent removed by distilling in vacuo to yield 588 g. of dark viscous product. This product was converted into its hydrochloride by dissolving it in one liter of isopropanol, acidifying the solution with concentrated hydrochloric acid and removing the solvents by distilling in vacuo. This salt was crystallized by dissolving it in one liter of warm acetone and cooling the acetone solution in an ice bath. The solid that separated was recrystallized from ethanol-ether to yield 382 g. (46% yield) of 8-(3-phenylpropyl) nortropinone hydrochloride, M.P. 175–177° C. with decomposition. In another run the product, 8-(3-phenylpropyl) nortropinone hydrochloride melted at 177–179° C. with decomposition.

*Analysis.*—Calcd. for $C_{16}H_{21}NO \cdot HCl$: HCl, 13.04. Found: HCl, 12.92.

8-(3-phenylpropyl)nortropinone in free base form was obtained by dissolving the hydrochloride in water and making the solution alkaline with 35% sodium hydroxide solution. The oil that separated was taken up in benzene; the benzene solution was washed three times with water and dried over anhydrous sodium sulfate; and the solvent was removed by distilling in vacuo. The remaining oil was distilled in vacuo to yield 314 g. (44% yield) of 8-(3-phenylpropyl)nortropinone as a colorless oil, B.P. 142–145° C. at 0.05 mm.

Other 8-(hydrocarbyl)nortropinones can be prepared following the above procedure for the preparation of 8-(3-phenylpropyl) nortropinone using other hydrocarbyl-amines in place of 3-phenylpropylamine, as follows: 8-benzylnortropinone using benzylamine; 8-(2-phenylethyl)-nortropinone using 2-phenylethylamine; 8-(4-phenylbutyl)nortropinone using 4-phenylbutylamine; 8-(3-phenyl-2-propenyl)nortropinone using 3-phenyl-2-propenylamine; 8-ethylnortropinone using ethylamine; 8-n-butylnortropinone using n-butylamine; 8-isoamylnortropinone using isoamylamine; 8-n-hexylnortropinone using n-hexylamine; 8-n-heptylnortropinone using n-heptylamine; 8-n-octylnortropinone using n-octylamine; 8-n-decylnortropinone using n-decylamine; 8-(4-methylphenyl)-nortropinone using 4-methylaniline, 8-cyclohexylnortropinone using cyclohexylamine; 8-(cyclopentylmethyl)nortropinone using cyclopentylmethylamine; 8-(2-cyclohexylethyl)nortropinone using 2-cyclohexylethylamine; and the like.

B. *8 - (hydrocarbyl) - 3 - phenylnortropine lower-alkanoates.*—The preparation of these compounds is illustrated by the following synthesis of 8-(3-phenylpropyl)-3-phenylnortropine acetate and its hydrochloride salt: Short pieces of lithium wire (1.7 g.) were suspended in 195 cc. of dry ether and a solution of 13.5 cc. of bromobenzene in 10 cc. of dry ether was added at reflux over a fifteen minute period. To this solution containing phenyllithium was added solwly at room temperature over a twenty-five minute period a solution of 28 g. of 8-(3-phenylpropyl)nortropinone in 180 cc. of dry benzene. The reaction mixture was refluxed for one hour and then cooled to about 20° C. To the cooled solution was added with stirring over a ten minute period a solution of 30 cc. of acetic anhydride in 30 cc. of dry benzene, maintaining the temperature at about 20° C. The reaction mixture was stirred for an additional thirty minutes, allowing the temperature to rise to room temperature. The reaction mixture was then chilled in an ice bath and 150 cc. of water was carefully added followed by sufficient 15% aqueous sodium hydroxide solution to render the aqueous layer strongly alkaline. The organic layer was separated, washed with water, dried over anhydrous sodium sulfate, and the solvent removed by distilling in vacuo. The residual oil was dissolved in ether and the basic product was removed by extracting with dilute acetic acid. The acidic solution was then made alkaline with dilute sodium carbonate solution; the resulting oil was removed by three extractions with ether; the combined extracts were washed with water and dried over anhydrous sodium sulfate; and the solvent was removed by distilling in vacuo. There was thus obtained, as a light yellow oil, 8-(3-phenylopropyl)-3-phenylnortropine acetate which was converted into its hydrochloride salt by dissolving it in 50 cc. of isopropanol and adding to this solution sufficient of a 28% solution of hydrogen chloride in isopropanol. The resulting solution was cooled well in an ice bath and the crystals that separated were collected and recrystallized twice from ethanol-ether to yield 1.9 g. (4.15% yield) of product, 8-(3-phenylpropyl) - 3 - phenylnortropine acetate hydrochloride, M.P. 180.4–181.2° C. (corr.).

*Analysis.*—Calcd. for $C_{24}H_{29}NO_2 \cdot HCl$: C, 72.08; H, 7.56; Cl, 8.87. Found: C, 72.16; H, 7.35; Cl, 8.83.

Following the above procedure using hydrobromic acid, sulfamic acid, citric acid or methanesulfonic acid in place of hydrogen chloride, there is obtained, respectively, 8-(3-phenylpropyl)-3-phenylnortropine acetate hydrobromide, 8-(3-phenylpropyl)-3-phenylnortropine acetate sulfamate, 8-(3-phenylpropyl)-3-phenylnortropine acetate citrate, and 8-(3-phenylpropyl)-3-phenylnortropine acetate methanesulfonate.

8-(3-phenylpropyl)-3-phenylnortropine acetate is obtained in its free base form by dissolving the hydrochloride salt in water, treating the aqueous solution with sodium hydroxide solution, extracting the liberated basic product with benzene, drying the benzene extract over anhydrous sodium sulfate and removing the benzene by distilling in vacuo.

Following the above procedure but using phenyl magnesium bromide in place of phenyllithium or using acetyl chloride in place of acetic anhydrided as the acetylating agent, the same product is obtained.

Pharmacological evaluation of 8-(3-phenylpropyl)-3-phenylnortropine acetate hydrochloride in aqueous solution administered intraperitoneally by the Rat Thermal Stimulus Method of Bass and Vander Brook has shown that this compound is approximately 10.4 times as potent an analgesic as meperidine hydrochloride. This compound was found to have an acute toxicity of 4.9±0.4 mg. per kg. in rats when administered intravenously in aqueous solution.

Other representative 8-(hydrocarbyl)-3-phenylnortropine lower-alkanoates that can be prepared according to the foregoing procedure described in Example 1B using the corresponding 8-(hydrocarbyl)nortropinone and appropriate lower-alkanoic anhydride are the following compounds of Examples 2–12. These compounds can be isolated in their free base form or in the form of their acid-addition salts, preferably their hydrochlorides, as illustrated.

EXAMPLE 2

8 - (3-phenylpropyl)-3-phenylnortropine n-propanoate hydrochloride is obtained following the procedure described in Example 1B using 8-(3-phenylpropyl)nortropinone and n-propanoic anhydride.

EXAMPLE 3

8-(3-phenylpropyl) - 3 - phenylnortropine n-butanoate hydrochloride is obtained following the procedure described in Example 1B using 8-(3-phenylpropyl)nortropinone and n-butanoic anhydride.

EXAMPLE 4

8-(3-phenylpropyl)-3-phenylnortropine 2-methylpropanoate hydrochloride is obtained following the procedure described in Example 1B using 8-(3-phenylpropyl)nortropinone and 2-methylpropanoic anhydride.

EXAMPLE 5

8-benzyl-3-phenylnortropine acetate hydrochloride is obtained following the procedure described in Example 1B using 8-benzylnortropinone and acetic anhydride.

EXAMPLE 6

8-(2-phenylethyl)-3-phenylnortropine acetate hydrochloride is obtained following the procedure described in Example 1B using 8-(2-phenylethyl)nortropinone and acetic anhydride.

EXAMPLE 7

8-(4-phenylbutyl)-3-phenylnortropine acetate hydrochloride is obtained following the procedure described in Example 1B using 8-(4-phenylbutyl)nortropinone and acetic anhydride.

EXAMPLE 8

8-(3-phenyl - 2 - propenyl)-3-phenylnortropine acetate hydrochloride is obtained following the procedure described in Example 1B using 8-(3-phenyl-2-propenyl)-nortropinone and acetic anhydride.

EXAMPLE 9

8-(4-methylphenyl)-3-phenylnortropine acetate hydrochloride is obtained following the procedure described in Example 1B using 8-(4-methylphenyl)nortropinone and acetic anhydride.

EXAMPLE 10

8-cyclohexyl-3-phenylnortropine acetate hydrochloride is obtained following the procedure described in Example 1B using 8-(cyclohexyl)nortropinone and acetic anhydride.

EXAMPLE 11

8-(cyclopentylmethyl)-3-phenylnortropine acetate hydrochloride is obtained following the procedure described in Example 1B using 8-(cyclopentylmethyl)nortropinone and acetic anhydride.

EXAMPLE 12

8-(2-cyclohexylethyl)-3-phenylnortropine acetate hydrochloride is obtained following the procedure described in Example 1B using 8-(2-cyclohexylethyl)nortropinone and acetic anhydride.

EXAMPLE 13

*8-alkyl - 3 - phenylnortropine lower-alkanoates.*—The preparation of these compounds is illustrated by the following synhesis of 3-phenyltropine acetate (same as 8-methyl-3-phenylnortropine acetate) and its hydrochloride: 1.52 g. of lithium wire, cut into short pieces was suspended in 150 cc. of dry ether and a solution of 11.6 cc. of bromobenzene in 10 cc. of dry ether was added at reflux over a fifteen minute period. After refluxing had been continued for one hour, the source of heat was removed and a solution of 13.9 g. of tropinone in 150 cc. of dry benzene was added at room temperature over a period of fifteen minutes. The reaction mixture was refluxed for one hour, cooled in an ice bath and to the cooled solution was added a solution of 38 cc. of acetic anhydride in 40 cc. of dry benzene over a period of about fifteen minutes. The reaction mixture was stirred at about 35–40° C. for thirty minutes, cooled in an ice bath and then carefully diluted with 50 cc. of water to destroy any unreacted lithium. A solution of 20 cc. of concentrated hydrochloric acid in 50 cc. of water was added and, after filtering to remove a small amount of dark insoluble material, the aqueous layer was separated, covered with benzene, and made alkaline with sodium carbonate. The liberated organic material was removed by extracting three times with benzene; the combined extracts were washed three times with water and dried over anhydrous sodium sulfate; and the solvent was removed by distilling in vacuo to yield 3-phenyltropine acetate as an oil. This compound was converted into its hydrochloride salt by dissolving it in 30 cc. of isopropanol and making the solution acid by dropwise addition of concentrated hydrochloric acid. The solution was chilled in an ice bath and the crystals which separated were collected, washed with isopropanol and recrystallized twice from ethanol-ether to yield 2.6 g. (8.8% yield) of 3-phenyltropine acetate hydrochloride, M.P. 169.8–170.6° C. (corr.) when dried in vacuo at 80° C. overnight.

*Analysis.*—Calcd. for $C_{16}H_{21}NO_2 \cdot HCl$: C, 64.96; H, 7.50; Cl, 11.99. Found: C, 65.15; H, 7.11; Cl, 11.82.

In another preparation following the above-described procedure the yield of the final product was doubled by maintaining the reaction mixture at a temperature of about 8–12° C. during and after the addition of acetic anhydride.

3-phenyltropine acetate in free base form is obtained following the procedure given above in Example 1B for the preparation of 8-(3-phenylpropyl)-3-phenylnortropine acetate in free base form.

Pharmacological evaluation of 3-phenyltropine acetate hydrochloride in aqueous solution administered intraperitoneally as described above has shown that this compound is approximately twice as potent an analgesic as meperidine hydrochloride. This compound was found to have an acute toxicity of 54.0±7.8 mg. per kg. in rats when administered intravenously in aqueous solution.

Other representative 8-alkyl-3-phenylnortropine lower-alkanoates that can be obtained following the procedure described in Example 13 using the corresponding 8-

(alkyl)-nortropinone and alkanoylating agent are the following compounds of Examples 14–21. These compounds can be isolated in their free base form or in the form of their acid-addition salts, preferably their hydrochlorides, as illustrated.

EXAMPLE 14

3-phenyltropine n-propanoate hydrochloride is obtained following the procedure described in Example 13 using tropinone and n-propanoic anhydride.

EXAMPLE 15

8-ethyl-3-phenylnortropine n-butanoate hydrochloride is obtained following the procedure described in Example 13 using 8-ethylnortropinone and n-butanoic anhydride.

EXAMPLE 16

8-n-butyl-3-phenylnortropine n-propanoate hydrochloride is obtained following the procedure described in Example 13 using 8-n-butylnortropinone and n-propanoic anhydride.

EXAMPLE 17

8-isoamyl-3-phenylnortropine acetate hydrochloride is obtained following the procedure described in Example 13 using 8-isoamylnortropinone and acetic anhydride.

EXAMPLE 18

8-n-hexyl-3-phenylnortropine acetate hydrochloride is obtained following the procedure described in Example 13 using 8-n-hexylnortropinone and acetic anhydride.

EXAMPLE 19

8-n-heptyl-3-phenylnortropine n-propanoate hydrochloride is obtained following the procedure described in Example 13 using 8-n-heptylnortropinone and n-propanoic anhydride.

EXAMPLE 20

8-n-octyl-3-phenylnortropine acetate hydrochloride is obtained following the procedure described in Example 13 using 8-n-octylnortropinone and acetic anhydride.

EXAMPLE 21

8-n-decyl-3-phenylnortropine acetate hydrochloride is obtained following the procedure described in Example 13 using 8-n-decylnortropinone and acetic anhydride.

My 8-hydrocarbyl-3-phenylnortropine alkanoates can be formulated in the manner conventional for potent analgesics, e.g., in liquid preparations in an aqueous or aqueous-ethanol menstruum, or in solid form, e.g., as tablets or powders. The tablet formulations can be prepared using conventional excipients; and the powders can be dispensed in capsule form. The preparations can be administered orally or, in the case of the aqueous preparations, intramuscularly or intravenously.

I claim:

1. As a composition of matter, 8-hydrocarbon-3-phenylnortropine lower-alkanoate esters where the hydrocarbon radical is non-acetylenic and has from one to ten carbon atoms inclusive.

2. 8-hydrocarbon-3-phenylnortropine lower-alkanoate esters in free base form where the hydrocarbon radical is non-acetylenic and has from one to ten carbon atoms inclusive.

3. Acid-addition salts of 8-hydrocarbon-3-phenylnortropine lower-alkanoates where the hydrocarbon radical is non-acetylenic and has from one to ten carbon atoms inclusive.

4. 8-alkyl-3-phenylnortropine lower-alkanoate esters in free base form where the alkyl radical has from one to ten carbon atoms inclusive and the lower-alkanoate moiety has from two to four carbon atoms inclusive.

5. Acid-addition salts of 8-alkyl-3-phenylnortropine lower-alkanoates where the alkyl radical has from one to ten carbon atoms inclusive and the lower-alkanoate moiety has from two to four carbon atoms inclusive.

6. 8-(phenylalkyl)-3-phenylnortropine lower-alkanoate esters in free base form where the 8-phenylalkyl substituent has from seven to ten carbon atoms inclusive and the lower-alkanoate moiety has from two to four carbon atoms inclusive.

7. Acid-addition salts of 8-(phenylalkyl)-3-phenylnortropine lower-alkanoates where the 8-phenylalkyl substituent has from seven to ten carbon atoms inclusive and the lower-alkanoate moiety has from two to four carbon atoms inclusive.

8. 3-phenyltropine acetate ester.

9. An acid-addition salt of 3-phenyltropine acetate.

10. 8-(3-phenylpropyl)-3-phenylnortropine acetate ester.

11. An acid-addition salt of 8-(3-phenylpropyl)-3-phenylnortropine acetate.

12. A process for the preparation of an 8-hydrocarbon-3-phenylnortropine lower-alkanoate in free base form where the hydrocarbon radical has from one to ten carbon atoms inclusive, which comprises: reacting the corresponding 8-(hydrocarbon)-nortropinone with a compound selected from the group consisting of phenyllithium and phenylmagnesium halide; and reacting the resulting 8-hydrocarbon-3-phenyl-nortropine as its metal salt with a lower-alkanoylating agent.

13. A process for the preparation of an 8-alkyl-3-phenylnortropine lower-alkanoate in free base form where the alkyl radical has from one to ten carbon atoms inclusive, which comprises reacting the corresponding 8-(alkyl)-nortropinone with phenyllithium and reacting the resulting 8-alkyl-3-phenylnortropine as its lithium salt with a lower-alkanoylating agent.

14. A process for the preparation of an 8-(phenylalkyl)-3-phenylnortropine lower-alkanoate in free base form where the phenylalkyl radical has from seven to ten carbon atoms inclusive, which comprises reacting the corresponding 8-(phenylalkyl)-nortropinone with phenyllithium and reacting the resulting 8-(phenylalkyl)-3-phenylnortropine as its lithium salt with a lower-alkanoylating agent.

15. A process for the preparation of 3-phenyltropine acetate which comprises reacting tropinone with phenyllithium and reacting the resulting 3-phenyltropine as its lithium salt with acetic anhydride.

16. A process for the preparation of 8-(3-phenylpropyl)-3-phenylnortropine acetate which comprises reacting 8-(3-phenylpropyl)nortropinone with phenyllithium and reacting the resulting 8-(3-phenylpropyl)-3-phenylnortropine as its lithium salt with acetic anhydride.

References Cited in the file of this patent

UNITED STATES PATENTS

| 2,748,132 | Karrer | May 29, 1956 |
| 2,748,133 | Karrer | May 29, 1956 |

FOREIGN PATENTS

| 644,115 | Great Britain | Oct. 4, 1950 |

OTHER REFERENCES

Cope et al.: J. Am. Chem. Soc., vol. 73, pp. 3419–3424 (1951).